US009158544B2

(12) United States Patent
Mykland

(10) Patent No.: US 9,158,544 B2
(45) Date of Patent: Oct. 13, 2015

(54) SYSTEM AND METHOD FOR PERFORMING A BRANCH OBJECT CONVERSION TO PROGRAM CONFIGURABLE LOGIC CIRCUITRY

(76) Inventor: Robert Keith Mykland, Capitola, CA (US)

(*) Notice: Subject to any disclaimer, the term of this patent is extended or adjusted under 35 U.S.C. 154(b) by 517 days.

(21) Appl. No.: 13/493,962

(22) Filed: Jun. 11, 2012

(65) Prior Publication Data
US 2013/0145134 A1 Jun. 6, 2013

Related U.S. Application Data

(63) Continuation-in-part of application No. 13/301,763, filed on Nov. 21, 2011, and a continuation-in-part of application No. 13/360,805, filed on Jan. 30, 2012, now Pat. No. 8,856,768, and a continuation-in-part of application No. 13/429,198, filed on Mar. 23, 2012, now Pat. No. 8,869,123.

(60) Provisional application No. 61/500,619, filed on Jun. 24, 2011.

(51) Int. Cl.
| G06F 9/50 | (2006.01) |
| G06F 9/30 | (2006.01) |
| G06F 9/38 | (2006.01) |
| G06F 9/45 | (2006.01) |

(52) U.S. Cl.
CPC .............. *G06F 9/30181* (2013.01); *G06F 8/40* (2013.01); *G06F 8/452* (2013.01); *G06F 9/38* (2013.01)

(58) Field of Classification Search
None
See application file for complete search history.

(56) References Cited

U.S. PATENT DOCUMENTS

| 5,317,743 | A | 5/1994 | Imai et al. |
| 5,488,707 | A | 1/1996 | Phillips et al. |
| 5,822,591 | A | 10/1998 | Hochmuth |
| 5,950,009 | A | 9/1999 | Bortnikov et al. |
| 5,974,538 | A | 10/1999 | Wilmot, II |
| 6,438,737 | B1 | 8/2002 | Morelli et al. |
| 6,717,436 | B2 | 4/2004 | Kress et al. |
| 6,832,370 | B1 | 12/2004 | Srinivasan et al. |
| 6,868,017 | B2 | 3/2005 | Ikeda |
| 6,988,183 | B1 | 1/2006 | Wong |
| 7,076,575 | B2 | 7/2006 | Baitinger et al. |

(Continued)

OTHER PUBLICATIONS

U.S. Appl. No. 13/301,763, filed Nov. 21, 2011, Robert Mykland.

*Primary Examiner* — Don Wong
*Assistant Examiner* — Shirin Alizadeh
(74) *Attorney, Agent, or Firm* — Patrick Reilly

(57) ABSTRACT

A method and system are provided for deriving a resultant software code from an originating ordered list of instructions that does not include overlapping branch logic. The method may include deriving a plurality of unordered software constructs from a sequence of processor instructions; associating software constructs in accordance with an original logic of the sequence of processor instructions; determining and resolving memory precedence conflicts within the associated plurality of software constructs; resolving forward branch logic structures into conditional logic constructs; resolving back branch logic structures into loop logic constructs; and/or applying the plurality of unordered software constructs in a programming operation by a parallel execution logic circuitry. The resultant plurality of unordered software constructs may be converted into programming reconfigurable logic, computers or processors, and also by means of a computer network or an electronics communications network.

20 Claims, 10 Drawing Sheets

(56) References Cited

U.S. PATENT DOCUMENTS

| | | |
|---|---|---|
| 7,155,602 B2 | 12/2006 | Poznanovic |
| 7,167,976 B2 | 1/2007 | Poznanovic |
| 7,171,659 B2 | 1/2007 | Becker et al. |
| 7,840,777 B2 | 11/2010 | Mykland |
| 7,840,950 B2 | 11/2010 | Stoodley et al. |
| 8,078,849 B2 | 12/2011 | Libby et al. |
| 2004/0019765 A1 | 1/2004 | Klein, Jr. |
| 2004/0068329 A1 | 4/2004 | Mykland |
| 2004/0107331 A1 | 6/2004 | Baxter |
| 2006/0004997 A1* | 1/2006 | Mykland ................. 712/244 |
| 2006/0242385 A1* | 10/2006 | Murakami et al. ........... 712/200 |
| 2007/0198971 A1* | 8/2007 | Dasu et al. ................ 717/140 |
| 2008/0005498 A1 | 1/2008 | Lujan Moreno et al. |
| 2008/0189703 A1* | 8/2008 | Im et al. .................. 718/100 |
| 2009/0119654 A1 | 5/2009 | Kawahito et al. |
| 2009/0240928 A1 | 9/2009 | Fischer et al. |
| 2011/0113411 A1 | 5/2011 | Yonezu |
| 2012/0096444 A1* | 4/2012 | Wright et al. ............. 717/137 |
| 2012/0331450 A1 | 12/2012 | Mykland |

\* cited by examiner

SYSTEM AND METHOD FOR PERFORMING A BRANCH OBJECT CONVERSION TO PROGRAM CONFIGURABLE LOGIC CIRCUITRY

CO-PENDING PATENT APPLICATIONS

This Nonprovisional patent application is a Continuation-in-Part application to Provisional Patent Application Ser. No. 61/500,619, filed on Jun. 24, 2011 by inventor Robert Mykland. Provisional Patent Application Ser. No. 61/500,619 is hereby incorporated by reference in its entirety and for all purposes, to include claiming benefit of the priority date of filing of Provisional Patent Application Ser. No. 61/500,619.

This Nonprovisional patent application is also a Continuation-in-Part application to Nonprovisional patent application Ser. No. 13/301,763, filed on Nov. 21, 2011 by inventor Robert Mykland and titled "CONFIGURABLE CIRCUIT ARRAY". Nonprovisional patent application Ser. No. 13/301,763 is hereby incorporated by reference in its entirety and for all purposes, to include claiming benefit of the priority date of filing of Nonprovisional patent application Ser. No. 13/301,763.

This Nonprovisional patent application is additionally a Continuation-in-Part application to Nonprovisional patent application Ser. No. 13/360,805, filed on Jan. 30, 2012 by inventor Robert Mykland and titled "SYSTEM AND METHOD FOR COMPILING MACHINE-EXECUTABLE CODE GENERATED FROM A SEQUENTIALLY ORDERED PLURALITY OF PROCESSOR INSTRUCTIONS". Nonprovisional patent application Ser. No. 13/360,805 is hereby incorporated by reference in its entirety and for all purposes, to include claiming benefit of the priority date of filing of Nonprovisional patent application Ser. No. 13/360,805.

Further more, this Nonprovisional patent application is a Continuation-in-Part application to Nonprovisional patent application Ser. No. 13/429,198, filed on Mar. 23, 2012 by inventor Robert Mykland and titled "SYSTEM AND METHOD FOR APPLYING A SEQUENCE OF OPERATIONS CODE TO PROGRAM CONFIGURABLE LOGIC CIRCUITRY". Nonprovisional patent application Ser. No. 13/429,198 is hereby incorporated by reference in its entirety and for all purposes, to include claiming benefit of the priority date of filing of Nonprovisional patent application Ser. No. 13/429,198.

FIELD OF THE INVENTION

The present invention relates to software, data processing and information technology. More particularly, the present invention relates to methods of and systems for modifying software code for application with electronic logic capable of reconfigurable, configurable, programmable, reprogrammable and/or parallel processing of logical operations

BACKGROUND OF THE INVENTION

The prior art provides software programs that consist of sequences of machine-executable commands that are organized as ordered lists of instructions that may be executed by a conventional, general purpose computer and that may allow for and include logical branching. However the use of software designed to be sequentially executed line-line by one or more central processor or arithmetic logic units may not allow for a more efficient operation possible by the special class of computational devices that may be configured, programmed and/or executed at least partly with parallel logic processing techniques.

There is therefore a long-felt need to provide methods and systems that enable a conversion of an originating software program into a resultant software program that (a.) supports the operation, configuration, reconfiguration, programming and/or reprogramming made possible by computational devices having parallel processing capability; and/or (b.) generates non-sequentially ordered software encoded constructs that may be used to form digital logic circuits.

SUMMARY AND OBJECTS OF THE INVENTION

It is an object of the method of the present invention (hereinafter "invented method") to provide a method and a system that enable the conversion of an originating software program into a resultant software program, wherein the resultant software program may be applied by a logic circuit that is capable of performing parallel computation and/or to form or describe the connectivity pathways of digital logic circuits.

Towards these objects and other objects that will be made obvious in light of this disclosure, a first version of the invented method provides a method and a system that modifies a plurality of software encoded instructions to generate a resultant unordered plurality of software encoded constructs (hereinafter, "software constructs") that may be executed by logic circuitry that is at least partially enabled to execute instructions in parallel. In one optional aspect of the invented method, one or more machine-executable instructions, e.g., opcodes, may be modeled by one or more software constructs, e.g. software objects.

It is understood that the scope of definition of the term "software construct" of the present disclosure includes a software encoded or software coded logical statement or instruction that may include (a.) an instruction such as an opcode, a command, machine-executable instruction, and/or a null instruction, e.g., or an instruction to not perform an operation, e.g. a no-op opcode; (b.) a datum or data; (c.) a variable; (d.) references to additional commands, data and variables; and/or other or additional opcode, mathematical expression or logic algorithm that may be expressed or represented in software in a form that is executable by a computer or from which a machine-executable instruction can be derived, determined or compiled.

In one aspect of the method of the present invention, a source program comprising an ordered list of software-encoded instructions that do not instantiate overlapping branch logic, e.g., a sequence of processor-executable opcodes that do not include any instances of overlapping branch logic, is converted into a functionally equivalent unordered plurality of software constructs. Data dependencies of the source program execution flow may be modeled within the unordered plurality of software constructs by associations of individual constructs or groups of software constructs. Memory dependencies may also be modeled within the unordered plurality of software constructs by associations of individual constructs or groups of constructs.

In an additional optional aspect of the invented method, a computational system having parallel processing logic circuitry and/or reconfigurable logic, and/or an information technology network that comprises parallel processing logic circuitry and/or reconfigurable logic, and is adapted to accept and execute the resultant unordered plurality of software constructs, wherein the resultant unordered plurality of software constructs are at least partially derived in accordance with one or more of the recited aspects of the invented method.

In certain still alternate preferred embodiments of the invented method, some or all of an array of reconfigurable logic circuits are communicatively or bi-directionally communicatively coupled to a memory, a back buffer, and one or more memory controllers.

In certain even additional aspects of the invented method, condition chains structures are built to combine all conditions that affect a predicated operation of a construct into a single condition equation, and thereby transform execution dependency logic into data dependency logic.

Additionally or alternately, the invented method provides or is employable by a reprogrammable logic unit as disclosed in U.S. Pat. No. 7,840,777 issued on Nov. 23, 2010 to inventor Robert Mykland and titled "Method and apparatus for directing a computational array to execute a plurality of successive computational array instructions at runtime" and a method of programming thereof.

Still additionally or alternately, the invented method provides a reprogrammable logic unit as disclosed in U.S. Nonprovisional patent application Ser. No. 13/301,763 filed on Nov. 21, 2011 to inventor Robert Mykland and titled "CONFIGURABLE CIRCUIT ARRAY" and a method of programming thereof.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Pat. No. 8,078,849 (inventors: Libby, et al.; issued on Dec. 13, 2011) titled "Fast execution of branch instruction with multiple conditional expressions using programmable branch offset table"; U.S. Pat. No. 7,840,950 (titled Stoodley, et al.; issued on Nov. 23, 2010) titled "Programmatic compiler optimization of glacial constants"; U.S. Pat. No. 7,840,777 (inventor: Mykland; issued on Nov. 23, 2010) titled "Method and apparatus for directing a computational array to execute a plurality of successive computational array instructions at runtime"; U.S. Pat. No. 6,438,737 (inventors: Morelli, et al.; issued on Aug. 20, 2002) titled "Reconfigurable logic for a computer"; U.S. Pat. No. 7,171,659 (inventors: Becker, et al.; issued on Jan. 30, 2007) titled "System and method for configurable software provisioning"; U.S. Pat. No. 7,167,976 (inventor: Poznanovic, D.; issued on Jan. 23, 2007) titled "Interface for integrating reconfigurable processors into a general purpose computing system"; U.S. Pat. No. 7,155,602 (inventor: Poznanovic, D.; issued on Dec. 26, 2006) titled "Interface for integrating reconfigurable processors into a general purpose computing system"; U.S. Pat. No. 7,076,575 (inventor: Baitinger, et al.; issued on Jul. 11, 2006) titled "Method and system for efficient access to remote I/O functions in embedded control environments"; U.S. Pat. No. 6,868,017 (inventor: Ikeda, K.; issued on Mar. 15, 2005) titled "Integrated circuit device"; and U.S. Pat. No. 6,717,436 (inventors: Kress, et al.; issued on Apr. 6, 2004) titled "Reconfigurable gate array".

Such incorporations further include in U.S. Nonprovisional patent application Ser. No. 13/301,763 filed on Nov. 21, 2011 to inventor Robert Mykland and titled "CONFIGURABLE CIRCUIT ARRAY"; US Patent Appn. Publication Ser. No. 20060004997 (inventor: Mykland, Robert; published on Jan. 5, 2006) titled "Method and apparatus for computing"; US Patent Appn. Publication Ser. No. 20040068329 (inventor: Mykland, Robert; published on Apr. 8, 2004) titled "Method and apparatus for general purpose computing"; US Patent Appn. Publication Ser. No. 20040019765 (inventor: Klein, Robert C. JR.; published on Jan. 29, 2004) titled "Pipelined reconfigurable dynamic instruction set processor"; and US Patent Appn. Publication Ser. No. 20040107331 (inventor: Baxter, Michael A.; published on Jun. 3, 2004) titled "Meta-address architecture for parallel, dynamically reconfigurable computing".

In addition, each and all publications, patents, and patent applications mentioned in this specification are herein incorporated by reference to the same extent in their entirety and for all purposes as if each individual publication, patent, or patent application was specifically and individually indicated to be incorporated by reference. The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE FIGURES

These, and further features of the invention, may be better understood with reference to the accompanying specification and drawings depicting the preferred embodiment, in which.

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
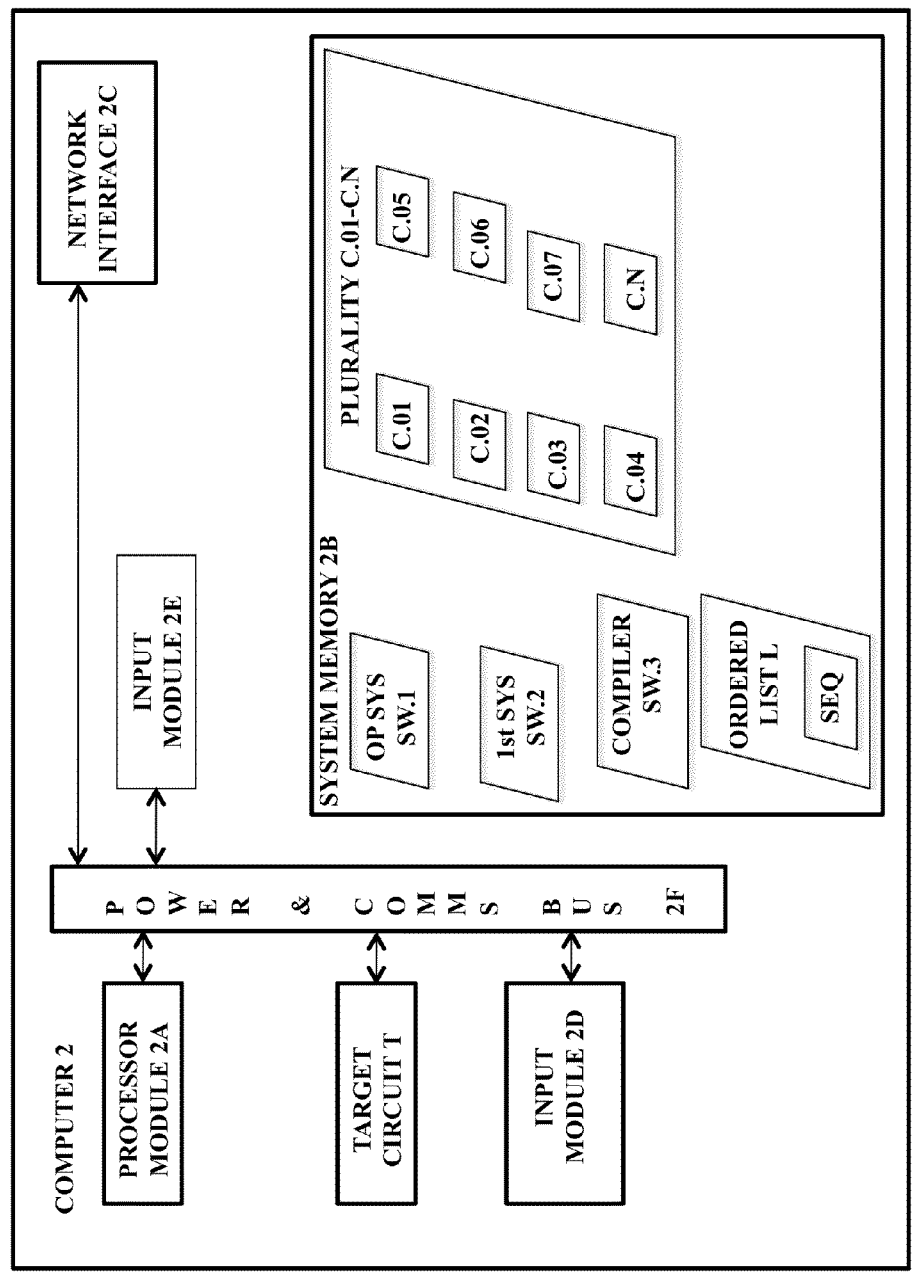
FIG. 1 is a functional block diagram of a prior art computational device having a processor module communicatively coupled with a memory module, a network interface, one or more input modules and one or more output modules.

FIG. 1 is a functional block diagram of the prior art computational device 2 (hereinafter "computer" 2) having the processor module 2A communicatively coupled with a memory module 2B, a network interface 2C, a data input module 2D, a data output module 2E, and a target circuit T. The processor module 2A may comprise one or more digital electronic microprocessors, such as, but not limited to, (a.) a CORE I7 Extreme Processor™ electronic microprocessor as marketed by Intel Corporation of Santa Clara, Calif.; (b) a NEHALEM™ microprocessor as marketed by Intel Corporation of Santa Clara, Calif.; (c.) a reprogrammable logic unit as disclosed in U.S. Pat. No. 7,840,777 issued on Nov. 23, 2010 to inventor Robert Mykland and titled "Method and apparatus for directing a computational array to execute a plurality of successive computational array instructions at runtime"; and/or (d.) an other suitable electronic; logic processors known in the art having programmable, reprogrammable, configurable and/or reconfigurable logic circuitry. The target circuit T may be or comprise parallel processing circuitry, configurable logic circuitry, reconfigurable logic circuitry, and/or reprogrammable logic circuitry.

The computer 2 may be or comprise (a.) an IPHONE™ cellular telephone as marketed by Apple, Inc. of Cupertino; (b.) an IPAD™ tablet computer adapted for generation of digitized photographic documents and capable of bi-directional communications via the telephony network and the Internet 6 as marketed by Apple, Inc. of Cupertino, Calif.; (c.) an HTC TITAN II™ cellular telephone as marketed by AT&T, Inc, of Dallas, Tex. and running a WINDOWS 7™ operating system as marketed by Microsoft Corporation of Redmond, Wash.; (d.) a GALAXY NEXUS™ smart phone as marketed by Samsung Group of Seoul, Republic of Korea and running an ANDROID™ operating system as marketed by Google, Inc. of Mountain View, Calif.; (e.) a TOUGHPAD™ tablet computer as marketed by Panasonic Corporation of Kadoma, Osaka, Japan and running an ANDROID™ operating system as marketed by Google, Inc. of Mountain View, Calif.; or (f.) other suitable computational system or electronic communications device known in the art.

A bi-directional internal communications bus 2F communicatively couples and provides electrical power to the processor module 2A with the memory module 2B, the network interface 2C, the data input module 2D, the data output modules 2E and the target circuit T.

The data input modules 2D may be or comprise a computer keyboard, a computer mouse, a point and click selection device, a track ball, a mouse pad, an external disk drive module, a memory stick and/or other suitable user input or data input devices known in the art. The data output modules 2E may be or comprise a display device having a display screen, a touch screen, a portable memory module and/or other suitable data output devices known in the art.

The network interface 2C is adapted to bi-directionally communicatively couple the computer 2 with an electronic communications network 3, such as the Internet, a computer network and/or a telephony network. It is understood that the network interface 2C may be adapted to provide wireless bi-directional communication between the computer 2 and the electronic communications network 3.

The system memory 2B stores an operating system SW.1, a first system software SW.2, a compiler SW.3, an originating ordered list of software coded instructions L (hereinafter, "the ordered list" L) comprising a sequence of software coded machine-executable instructions 4000-4999 SEQ, and a plurality C of constructs C.01-C.N.

The operating system SW.1 directs the operations of computer 2, controlling and scheduling the execution of other programs, and managing storage, input/output actions, and communication resources, and may be or comprise a LINUX™ or UNIX™ or derivative operating system, such as the DEBIAN™ operating system software as provided by Software in the Public Interest, Inc. of Indianapolis, Ind.; a WINDOWS XP™, VISTA™ or WINDOWS 7™ operating system as marketed by Microsoft Corporation of Redmond, Wash.; a MAC OS X operating system or iPhone G4 OS™ operating system as marketed by Apple, Inc. of Cupertino, Calif.; or an other suitable operating system known in the art.

The first system software SW.2 provides machine executable instructions to cause and enable the computer 2 to instantiate the aspects of the invented method as disclosed herein. The ordered list L is an ordered list of software coded instructions that includes the sequence of software coded machine-executable instructions 4000-4999 SEQ (hereinafter, "sequence" SEQ) upon which one or more aspects of the invented method may be applied by the computer 2 to generate each of the plurality of resultant software coded constructs C.01-C.N (hereinafter, "constructs" C.01-C.N), wherein neither the ordered list L nor the sequence SEQ include software instruction that generate overlapping logic branching. It is understood that the term "source program" as used within the present disclosure indicates machine-executable software code and does not refer to higher-level source code programs or source programming languages.

Figure 2:
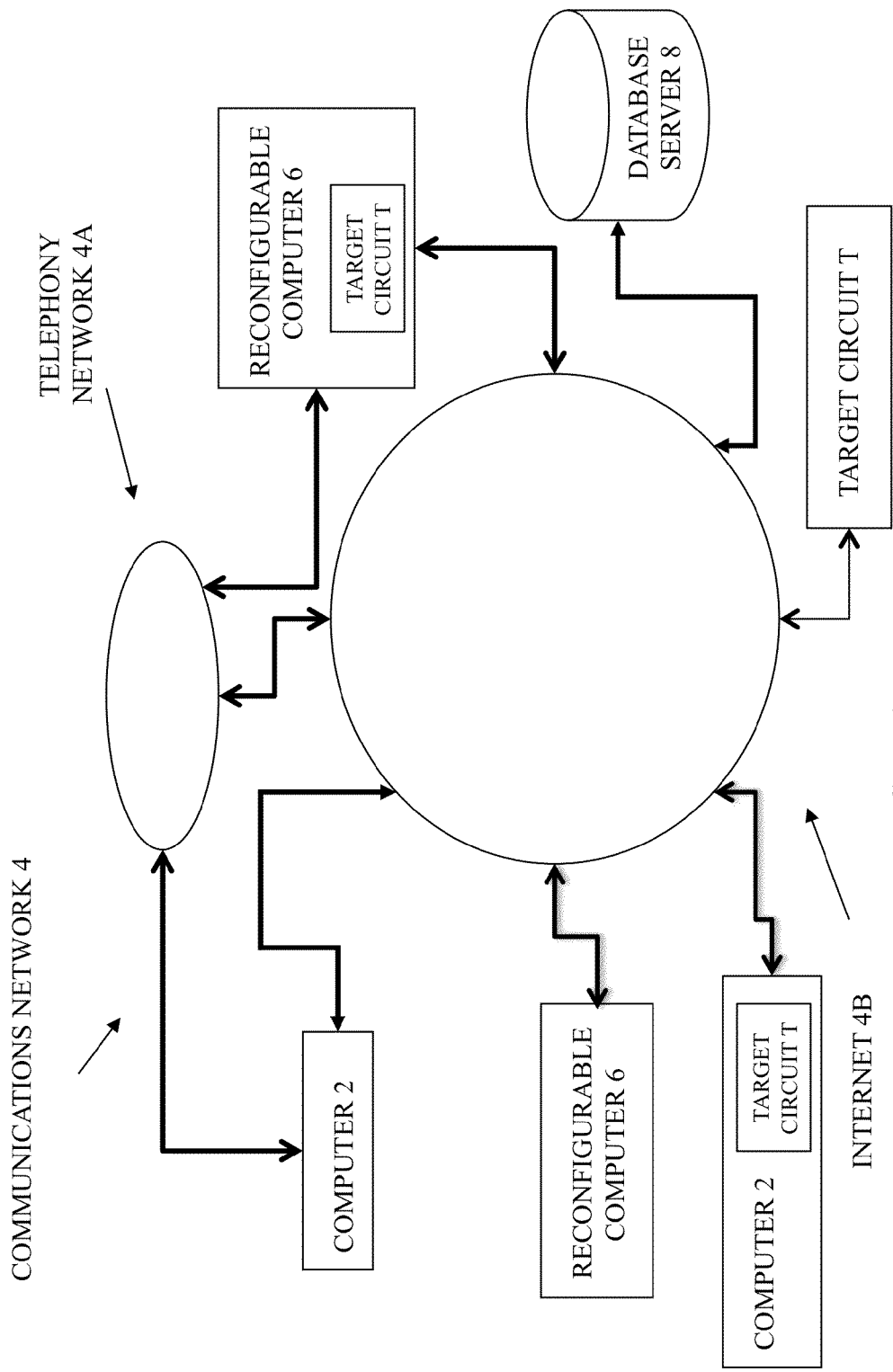
FIG. 2 is an information technology network that comprises at least one prior art computational device of FIG. 1.

FIG. 2 is a schematic diagram of the electronics communications network 4 (hereinafter "network" 4) that comprises the computer 2, a reconfigurable computer 6, a database server 8 and/or the target circuit T. The network 4 is an information technology network that may additionally comprise a telephony network 4A and/or the Internet 4B.

One or more computers 2, reconfigurable computers 6, and database servers 8 may comprise one or more elements 2A-2E & T or aspects of the computer 2. It is understood that one or more of the aspects of the invented method may be executed in singularity, in concert, or in combination by one or more computer 2, reconfigurable computer 6 and/or database server 8. It is further understood that one or more target circuits T, reconfigurable computers 6 and/or database servers 8 may be or comprise (a.) an IPHONE™ cellular telephone as marketed by Apple, Inc. of Cupertino; (b.) an IPAD™ tablet computer adapted for generation of digitized photographic documents and capable of bi-directional communications via the telephony network and the Internet 6 as marketed by Apple, Inc. of Cupertino, Calif.; (c.) an HTC TITAN II™ cellular telephone as marketed by AT&T, Inc. of Dallas, Tex. and running a WINDOWS 7™ operating system as marketed by Microsoft Corporation of Redmond, Wash.; (d.) a GALAXY NEXUS™ smart phone as marketed by Samsung Group of Seoul, Republic of Korea and running an ANDROID™ operating system as marketed by Google, Inc. of Mountain View, Calif.; (e.) a TOUGHPAD™ tablet computer as marketed by Panasonic Corporation of Kadoma, Osaka, Japan and running an ANDROID™ operating system as marketed by Google, Inc. of Mountain View, Calif.; or (f.) other suitable computational system or electronic communications device known in the art.

The reconfigurable computer 6 may be or comprise a configurable circuit array as disclosed and enabled in Nonprovisional patent application Ser. No. 13/301,763, or other suitable configurable, programmable, reconfigurable and/or reprogrammable processing device or circuit known in the art.

It is further understood that computer 2, reconfigurable computer 6 and/or database server 8 may be applied to derive or generate one or more pluralities C of constructs C.01-C.N by the application of various aspects of the invented method from the one or more ordered lists L and opcode sequences SEQ.

Figure 3:
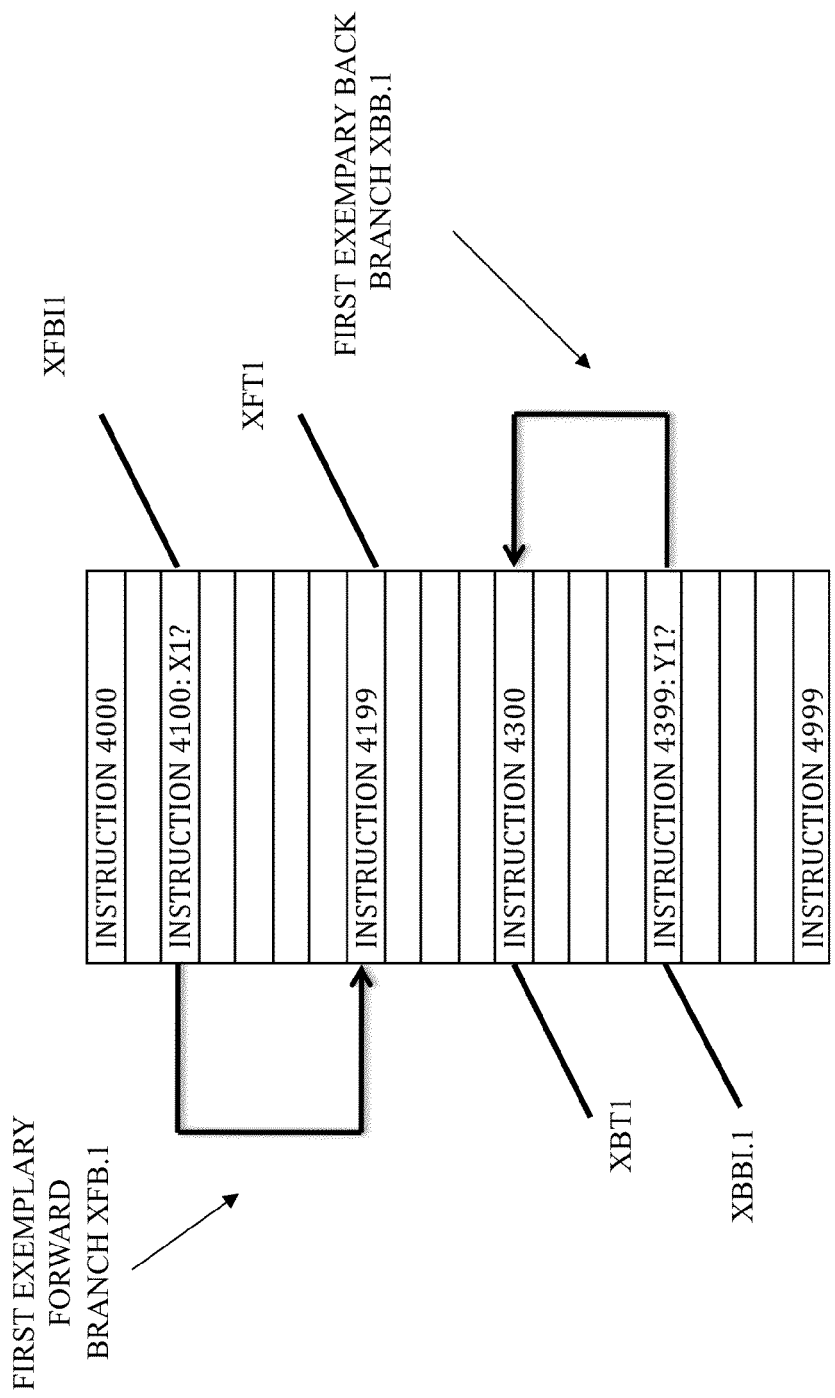
FIG. 3 is a representation of a sequential listing of software-encoded, machine-executable instructions that comprise or are provided within a selected sequence of a source software program or a resultant program as disclosed within.

FIG. 3 is a representation of the representative sequence SEQ that includes a plurality of software-encoded, machine-executable instructions 4000-4999 SEQ that are comprised and ordered within the ordered list L. It is understood that ordered list L and/or the sequence SEQ may be or comprise a sequentially ordered listing of associated and software objects or other software coded instructions.

The executable instructions 4000-4999 SEQ are ordered for an intended order of sequential execution starting at a first instruction 4000 and proceeding through the execution of intervening instructions 4001 through 4998 until the execution of a last instruction 4999, wherein branch operations can cause the processor module 2A or target circuit T to not execute certain instructions 4000-4999 SEQ and/or to repeatedly execute certain instructions 4000-4999 SEQ.

It is understood that the term "descending order" is defined herein to denote executing, instantiating, analyzing, processing or examining the instructions 4000-4999 SEQ in sequential order starting at the first instruction 4000 and proceeding to the last instruction 4999.

It is also understood that the term "ascending order" is defined herein to denote executing, instantiating, analyzing, processing or examining the instructions 4000-4999 SEQ in sequential order opposite form the intended order of execution starting at the last instruction 4999 and proceeding to the first instruction 4000.

It is further understood that exemplary first forward branch XFB.1 and exemplary first back branch XBB.1 can be applied by the computer 2 to direct the processor module 2A to alternately (a.) skip over and not execute certain instructions; or (b.) to repeat an execution of certain instructions. For example, a first exemplary forward branch conditional logical query XFBI1 of the instruction 4100 directs the processor module 2A to proceed from executing step 4100 to step 4199 when a logical condition or value of X1 is determined to exist at the instant execution of step 4100. Logical instructions 4101 to 4199 are thus not executed by the computer 2 when the processor module 2A finds in an execution of instruction 4100 that a logical condition X1 exists, but rather the computer 2 proceeds to execute instruction 4199, i.e., forward target label 4199, as a next executed instruction after the instant execution of step 4100.

The term "forward branch instruction" is defined herein to denote a software encoded conditional logical query or test wherein a determination by the executing computer 2 or 4 of a condition or value directs the computer 2 or the reconfigurable computer 4 to proceed from the instant instruction to a forward target label, e.g., instruction 4199, without executing all instructions of comprising the ordered list L or the sequence SEQ intervening between the instant exemplary forward branch instruction XFBI1 and an associated exemplary forward target label XFT1.

It is further understood that a back branch conditional logical query or test of the first exemplary back branch instruction XBBI1 located within instruction 4399 directs the processor module 2A to proceed from executing back branch instruction 4399 to executing an instruction 4300 associated with an exemplary back target label XBT1 when the processor module 2A finds in an execution of instruction 4399 that a pre-specified logical condition exists. According to the exemplary first back branch instruction XBBI1, the processor module 2A proceeds from instruction 4399 to execute instruction 4300 when a logical condition Y1 is met in the execution of instruction 4399 that is associated with the first back branch instruction XBBI1.

The term "back branch instruction" is defined herein to denote a software encoded conditional logical query or test wherein a determination of a condition or value directs the computer 2 or the reconfigurable computer 4 to proceed from processing the instant back branch instruction, e.g., instruction 4399, to next executing a back target label XBT1, e.g., the back target label XBT1 associated with instruction 4300.

It is still further understood that one or more conditional logical queries or tests X1 or Y1 may be a negative query or test, wherein a determination of a nonexistence of a specified logical condition or value at the time of execution of the instant branch instruction XFBI.1 & XBBI.1 will lead to a positive finding of the query or test and thereby result in an activation of an associated back branch XBB.1 or a forward branch XFB.1.

The term "back branch instruction" is defined herein to denote a conditional logical query or test wherein a positive finding directs the computer 2 or the reconfigurable computer 6 to proceed from an instant back branch instruction, e.g., instruction 4399, to a back target label, e.g., instruction 4300, wherein the back target label is located previous to the instant back branch instruction in the instruction sequence of instructions 4000-4999 SEQ.

It is understood that the terms "target" and "target label" as used herein indicate software code 4199 & 4300 within the instruction sequence 4000-4999 SEQ to which a computer 2 or 4 next references or executes after the execution of a branch instruction 4100 & 4399 as determined by the host computer 2 or 4.

Figure 4:
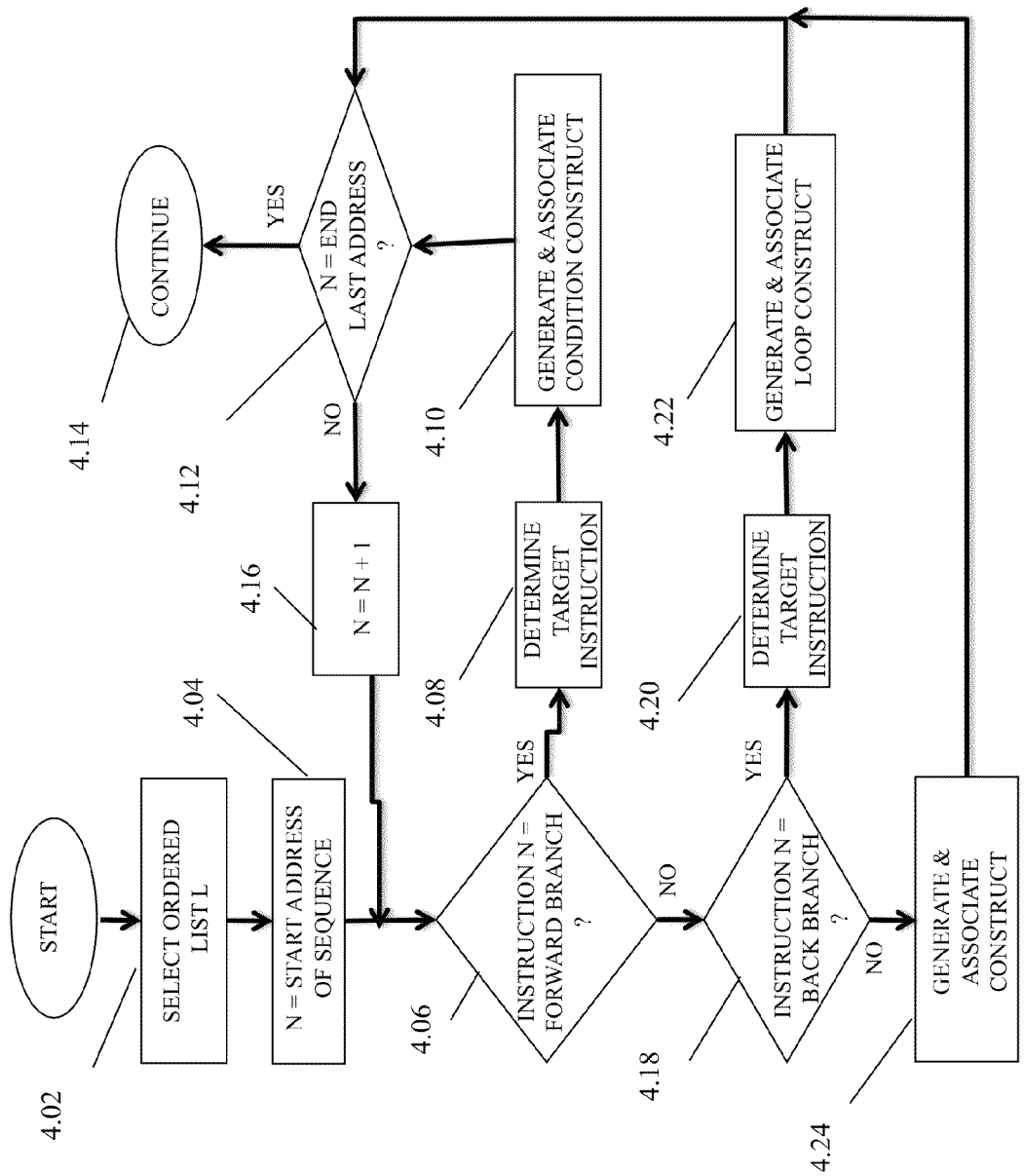
FIG. 4 is a flow chart of certain aspects of the invented method that a first system software may optionally include and that are executable by the computer of FIG. 1.

Referring now to FIG. 4, FIG. 4 is a flow chart of certain aspects of the invented method that the first system software SW.2 may optionally include and that are executable by the computer 2. The ordered list L is selected in step 4.02 and a counter N is initialized to be equal to the address of a first instruction 4000 within the sequence SEQ. The processor 2A then determines in step 4.06 whether the instruction of the sequence SEQ at the address N within the sequence SEQ is a conditional forward branch instruction. When the processor 2A determines in step 4.06 that the instruction of the sequence SEQ at the address N within the sequence SEQ is a conditional forward branch instruction, the processor 2A proceeds to step 4.08 and to determine a target instruction of the sequence SEQ to which the instant conditional forward branch instruction located at address N conditionally directs code execution flow. The processor 2A then proceeds for step 4.08 to step 4.10 and to generate a condition construct C.01-C.N, wherein the condition construct provides an equivalent logic to the instant forward branch instruction of step 4.08, wherein a machine-executable instruction and all dependencies of the instant forward branch instruction are replicated by a combination of logic of the condition construct C.01-C.N and association of the condition construct C.01-C.N with other constructs C.01-C.N. The processor 2A proceeds from step 4.10 to step 4.12 and to examine the value of the counter N to determine whether the value of the counter N is equal to the last instruction address 4999 of the sequence SEQ. When the processor 2A determines in step 4.12 that the value of the counter N is equal to or greater than the last instruction address 4999 of the sequence SEQ, the computer 2 proceeds on to step 4.14 and to perform additional computational operations. Alternatively, when the processor 2A determines in step 4.12 that the value of the counter N is not equal to or greater than the last instruction address 4999 of the sequence SEQ, the computer 2 proceeds on to step 4.14 to step 4.16 and to increment the counter N. The processor 2A proceeds from step 4.16 to an additional execution of step 4.06.

When the processor 2A determines in step 4.06 that the instruction of the sequence SEQ at the address N within the sequence SEQ is not a conditional forward branch instruction, the processor 2A proceeds to step 4.18 and to determine whether the instruction of the sequence SEQ at the address N within the sequence SEQ is a conditional back branch instruction.

When the processor 2A determines in step 4.18 that the instruction of the sequence SEQ at the address N within the sequence SEQ is a conditional back branch instruction, the processor 2A proceeds to step 4.20 and to determine a target instruction of the sequence SEQ to which the instant back branch instruction located at address N conditionally directs code execution flow. The processor 2A then proceeds for step 4.20 to step 4.22 and to generate a loop construct C.01-C.N, wherein the loop construct provides an equivalent logic to the instant conditional back branch instruction of step 4.08, wherein a machine-executable instruction and all dependencies of the instant forward branch instruction are replicated by a combination of logic of the loop construct C.01-C.N and association of the condition construct C.01-C.N with other constructs C.01-C.N. The processor 2A proceeds from step 4.22 to step 4.12 and to examine the value of the counter N to determine whether the value of the counter N is equal to the last instruction address 4999 of the sequence SEQ.

Alternatively, when the processor 2A determines in step 4.18 that the instruction of the sequence SEQ at the address N within the sequence SEQ is not a conditional back branch instruction, the processor 2A proceeds to step 4.24 and to generate a construct C.01-C.N, wherein the construct provides an equivalent logic to the instant instruction located at address N within the sequence SEQ, wherein a machine-executable instruction and all dependencies of the instant instruction are replicated by a combination of logic of the generated construct C.01-C.N and association of the generated construct C.01-C.N with other constructs C.01-C.N. The processor 2A proceeds form step 4.24 to step 4.12.

Figure 5:
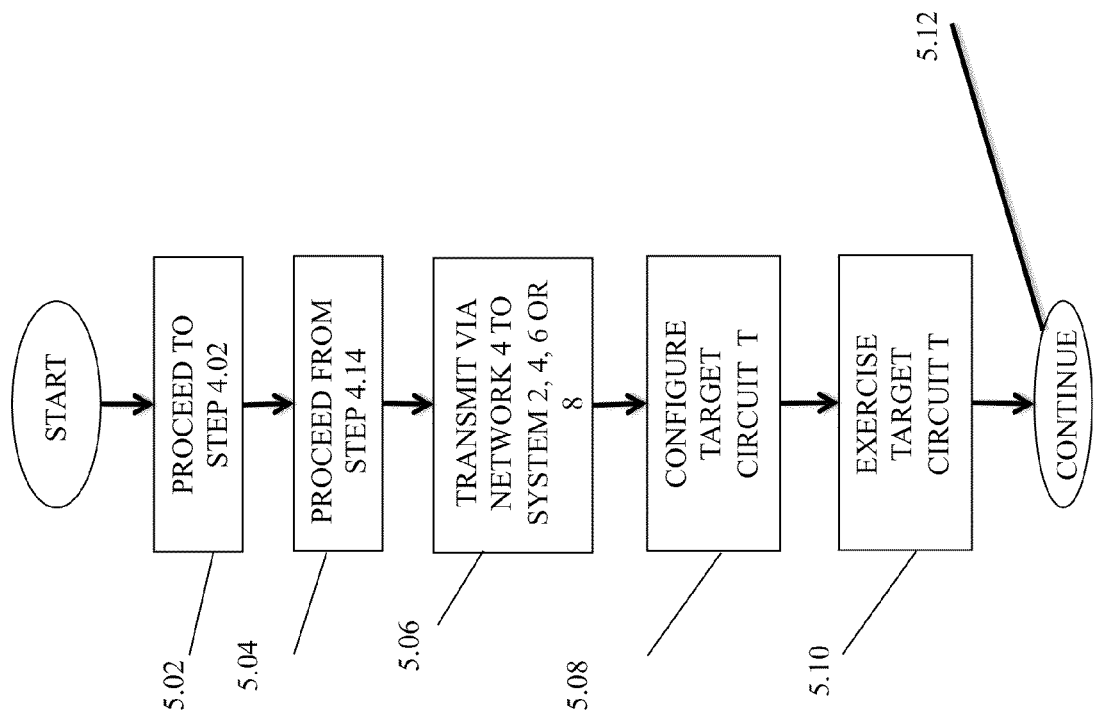
FIG. 5 is a flowchart of additional optional computational processing executable by the computer of FIG. 1.

Referring now to FIG. 5, FIG. 5 is a flowchart of additional optional computational processing executable by the computer 2, wherein in step 5.02 and step 5.04 the computer 2 executes the instructions of step 4.02 through step 4.14. In optional step 5.06 the plurality of constructs C.01-C.N generated in steps 4.02 through 4.14 are communicated by electronic media or by electronic messaging via the network 4 to an alternate computer 2, reconfigurable computer 6, database server 8 or target circuit T. The target circuit T is configured in step 5.08 in accordance with the plurality of constructs C.01-C.N and the target circuit T is exercised in step 5.10 as configured in step 5.08. The computer 2 proceeds from step 5.10 on to step 5.12 and to perform additional computational operations.

Figure 6:
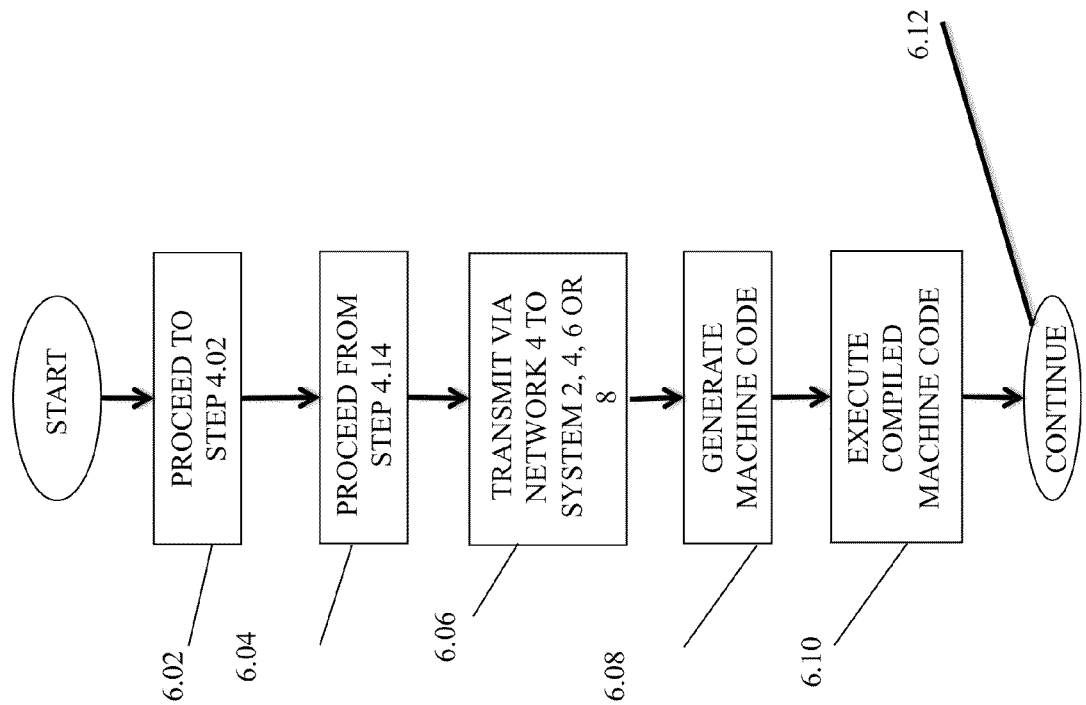
FIG. 6 is a flowchart of still additional optional computational processing executable by the computer of FIG. 1.

Referring now to FIG. 6, FIG. 6 is a flowchart of still additional optional computational processing executable by the computer 2, wherein in step 6.02 and step 6.04 the computer 2 executes the instructions of step 4.02 through step 4.14. In optional step 6.06 the plurality of constructs C.01-C.N generated in steps 4.02 through 4.14 are communicated by electronic media or by electronic messaging via the network 4 to an alternate computer 2, reconfigurable computer 6, database server 8 or target circuit T. The compiler SW.3 is applied to the plurality of constructs C.01-C.N in step 6.08 to a generate machine-executable code SW.M derived from the plurality of constructs C.01-C.N, and the machine executable code SW.M is executed in step 6.10 at least partially by the target circuit T. The computer 2 proceeds from step 6.10 on to step 6.12 and to perform additional computational operations.

It is understood that the machine-executable code SW.M may be expressed in the VERILOG™ programming language and that the alternate computer 2, reconfigurable computer 6, database server 8 or target circuit Target circuit may be or comprise a programmable circuit, such as a VIRTEX-7™ field programmable gate array as marketed by Xilinx Corporation of San Jose, Calif., a STRATIX V™ field programmable gate array as marketed by Altera Corporation of San Jose, Calif., and/or other suitable programmable devices known in the art.

As one illustrative example, the machine code SW.M might be written in the VERILOG™ software language and in step 6.10 the VERILOG machine code SW.M may be used to program a VIRTEX-7™ field programmable gate array as marketed by Xilinx Corporation of San Jose, Calif., a STRATIX V™ field programmable gate array as marketed by Altera Corporation of San Jose, Calif., and/or other suitable programmable devices known in the art. It is understood that logical structure of the VERILOG machine code SW.M may be reduced to, an embodied within, an applications specific integrated circuit using the suitable proprietary tools of Xilinx Corporation or Altera Corporation, or other suitable ASIC generation tools known in the art.

Figure 7:
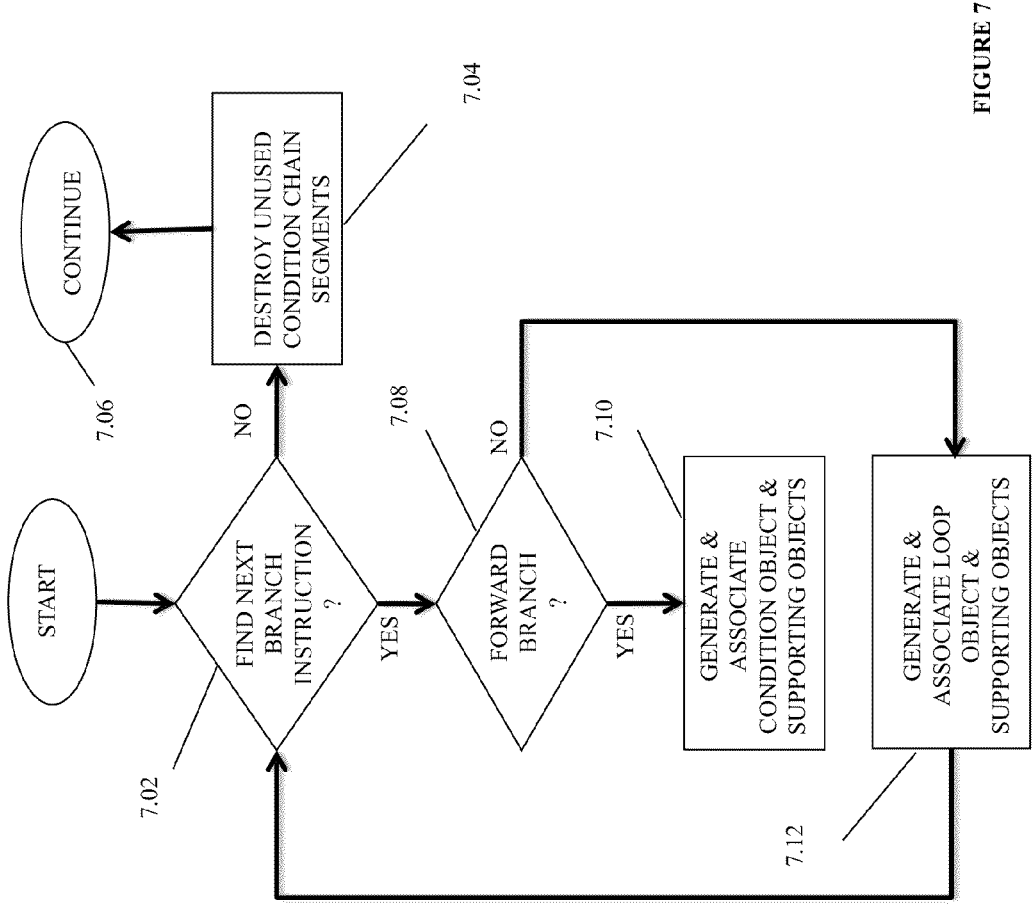
FIG. 7 is a flowchart of an embodiment of the invented method wherein an ordered list of software objects that each optionally include an opcode into a non-linearly ordered plurality of software objects that are associated to replicate the process and logic of the ordered list of software objects.
Figure 8:
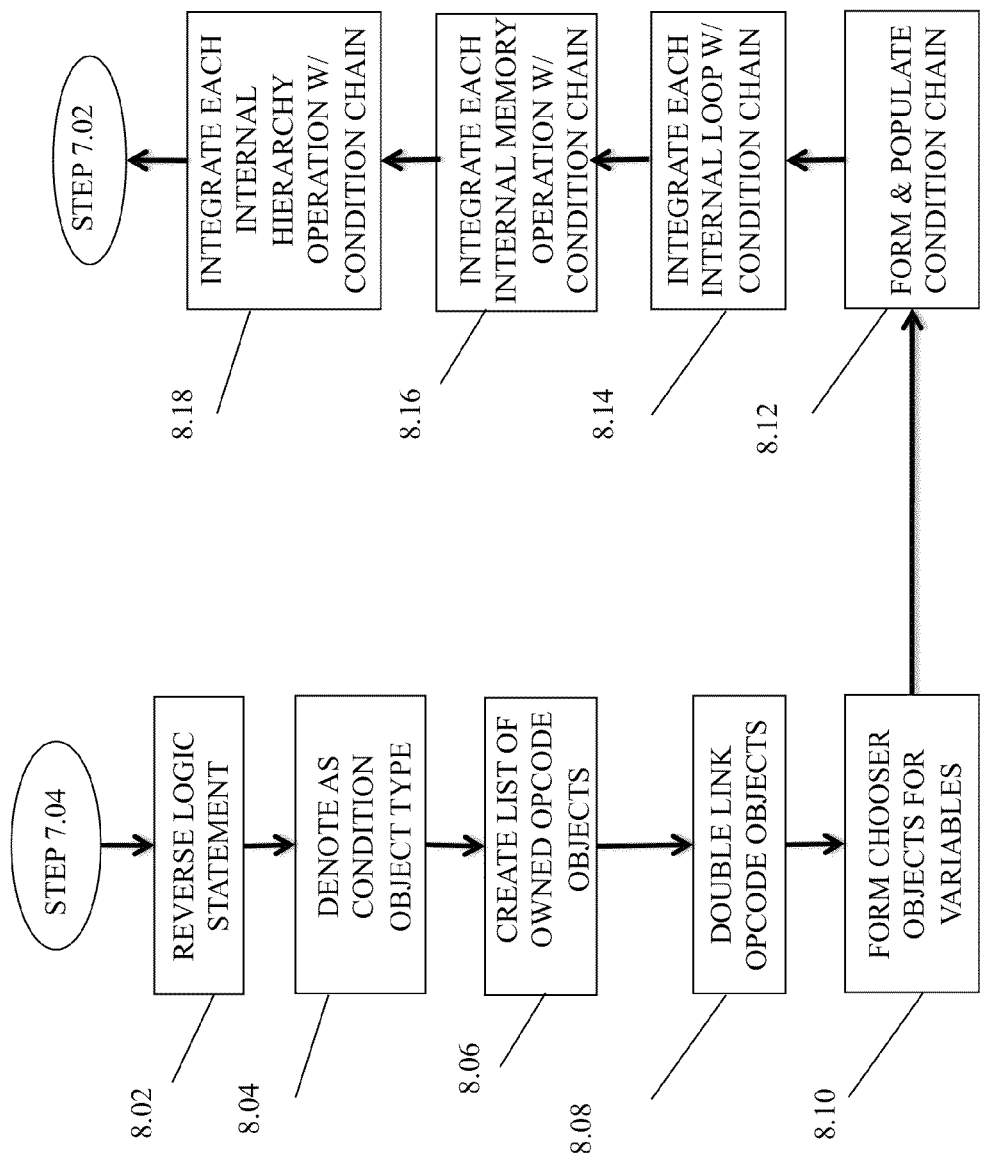
FIG. 8 is a flowchart of an instance of an aspect of the process of FIG. 7 wherein the logic and flow of a forward branch logic as expressed by the ordered list of software objects is replicated by a plurality of non-linearly ordered software objects.
Figure 9:
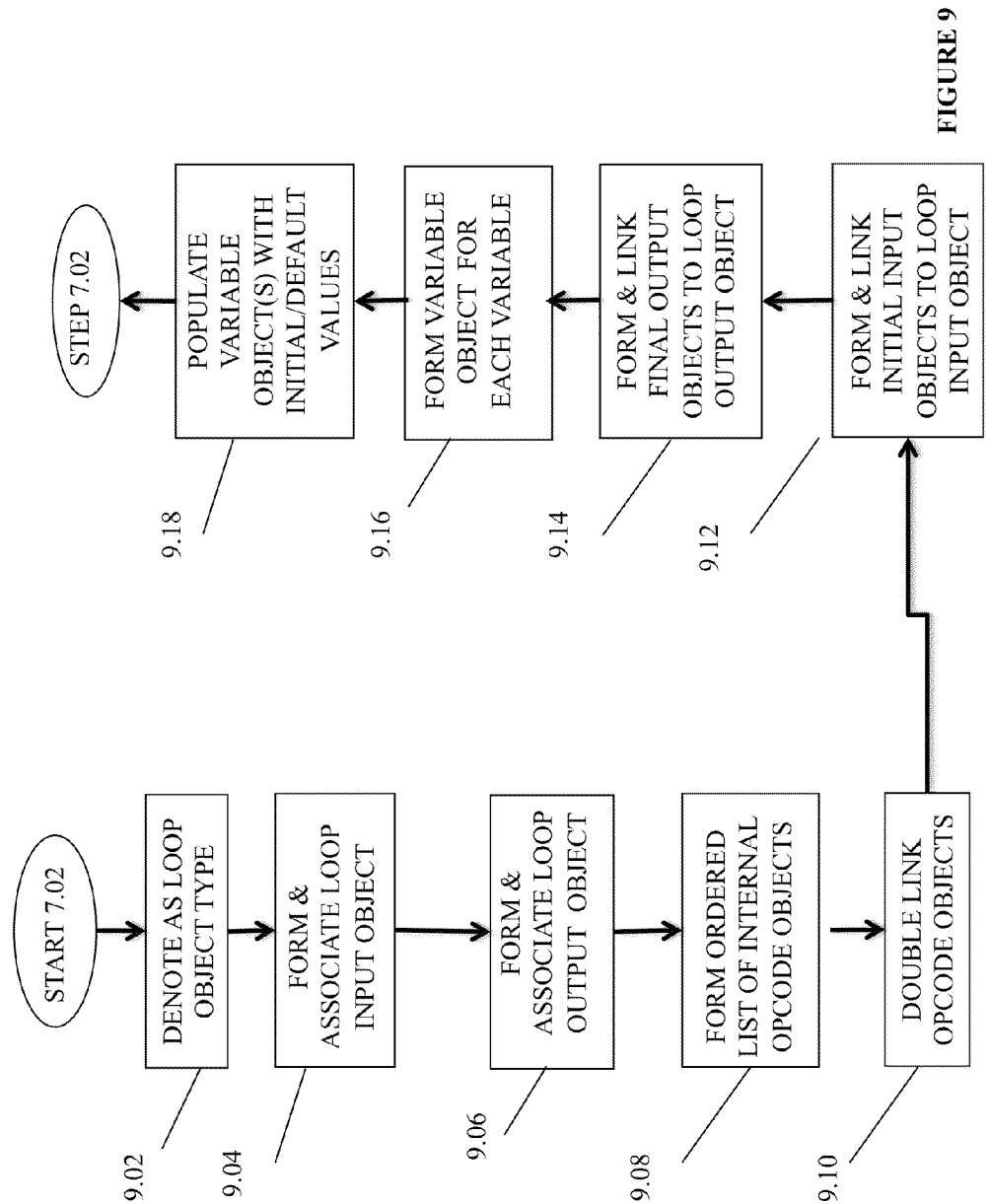
FIG. 9 is a flowchart of an instance of an aspect of the process of FIG. 7 wherein the logic and flow of a back branch logic as expressed by the ordered list of software objects is replicated by a plurality of non-linearly ordered software objects.

Referring now to FIGS. 7, 8, and 9, the ordered list L and the plurality of constructs C.01-C.N will be discussed and viewed as software objects for the purposes of illustration of certain aspects of the invented method. It is understood that this discussion, analysis and treatment of the ordered list L and the plurality of constructs C.01-C.N as software objects in the explanations of FIGS. 7, 8 and 9 are not limiting but are merely a presentation of a preferred embodiment of the invented method.

Referring now to FIG. 7, FIG. 7 is a flow chart of an alternate process executable by the computer 2 and including one or more aspects of the invented method that optionally may be employed within a process of a conversion of the ordered list L into the plurality of constructs C.01-C.N, wherein the sequence SEQ of the ordered list L is an ordered list of software objects as directed by the first system software SW.2 and the complier SW.3 and each of the plurality of constructs C.01-C.N are software objects. In step 7.02 a next branch object in descending order within the sequence SEQ is sought by the processor 2A. At this point in the operation of the compiler SW.3, all branches are all nested to arbitrary depth, and conversion from instructions 4000-4999 to constructs C.01-C.N is sequentially processed from outermost nested branch to an innermost nested branch at all points in the sequence SEQ. Alternatively, the conversions from of branch instruction of the instructions 4000-4999 can be done in any order, but after conversions, the condition constructs C.01-C.N referred to herein are resorted so that the conditions appearing in each of these conditions constructs C.01-C.N is in order from each outermost condition construct C.01-C.N to each enclosed innermost condition construct C.01-C.N.

When no further branch instruction, e.g., branch object, of the order list L is found after the last examined instruction 4000-4998 and the last instruction 4999 of the sequence SEQ, the processor 2A proceeds on to step 7.04 and to destroy all unused condition chain segments. Condition chains are structures built to combine all conditions that affect a predicated operation of a construct C.01-C.N into a single condition equation, and thereby transform execution dependency logic into data dependency logic. It is understood that the compiler SW.3 builds these condition chain structures for each condition construct C.01-C.N even though particular condition chains might not be used when an instant condition construct C.01-C.1 does not contain any nested loops or memory operations; wherein condition chains should be destroyed when they are not needed. The processor 2A proceeds from step 7.04 to step 7.06 to perform alternate computational processing.

An exemplary instance of generating a data dependency logical statement or equation from an execution dependency logical statement or statement is now provided. Consider the following software program written in the C™ programming language:

```
int main( )
{
    int x = getchar( );
    int y = getchar( );
    int z = getchar( );
    if( x == 'a')
    {
        putchar( 'u');
        if( y == 'b')
        {
            putchar('v');
            if( z == 'c')
                putchar('w');
        }
    }
    putchar( '\n');
    return 0;
}
```

This exemplary C program includes dependencies that are based upon an execution of a previous command or instruction of the ordered list of instructions L, i.e., this exemplary C program exhibits execution dependencies. The compiler SW.3 might accept the exemplary C program and generate the following low level virtual machine byte code:

```
internal int %main( ) {
entry:
    %tmp = call int (...)* %getchar( )        ; <int> [#uses=1]
    %tmp1 = call int (...)* %getchar( )       ; <int> [#uses=1]
    %tmp2 = call int (...)* %getchar( )       ; <int> [#uses=1]
    %tmp = seteq int %tmp, 97                 ; <bool> [#uses= 1]
    br bool %tmp, label %cond_true, label %cond_next16
cond_true:                                    ; preds = %entry
    %tmp422 = call int %putchar( int 117)     ; <int> [#uses=0]
    %tmp6 = seteq int %tmp1, 98               ;<bool> [#uses=1]
    br bool %tmp6, label %cond_true7, label %cond_next16
cond_true7:                                   ; preds = %cond_true
    %tmp821 = call int %putchar( int 118)     ; <int> [#uses=0]
    %tmp10 = seteq int %tmp2, 99              ;<bool> [#uses=1]
    br bool %tmp10, label %cond_true11, label %cond_next16
cond_true11:                                  ; preds = %cond_true7
    %tmp1220 = call int %putchar( int 119)    ;<int> [#uses=0]
    br label %cond_next16
cond_next16:                                  ; preds = %cond_true11, %cond_true7, %cond_true, %entry
    %tmp1719 = call int %putchar( int 10)     ; <int> [#uses=0]
    ret int 0
}
```

The compiler SW.3 would then derive from the exemplary LLVM byte code the following exemplary unordered software object list of the plurality of constructs C.01-C.N:

```
 1 { /* main */
 0 { PASS 0 - { }{ } /* */ }
 1 { TRUNC 0 - { 0 }{ } /* */ }
 2 { GLOBAL 4 - { 3 }{ } /* */ }
 3 { GLOBAL 4 - { 4 }{ } /* */ }
 4 { GLOBAL 4 - { 5 }{ } /* */ }
 5 { IN 6 - { 1 2 }{ } /* */ }
 6 { PARAM 4 2 { 5 }{ 17 } /* 1 */ }
 7 { PARAM 0 0 { 5 }{ 17 } /*0 */ }
 8 { PI 0 - { 7 9 }{ 17 } /* */ }
 9 { VLOAD 1 - { 6 8 }{ 17 } /*tmp.i */ }
10 { UEXTEND 4 - { 9 }{ 17 } /*tmp6.i */ }
11 { CONST 4 1 { 5 }{ 17 } /* */ }
12 { AND 4 - { 10 11 }{ 17 } /*tmp2.i */ }
13 { CONST 4 0 { 5 }{ 17 } /* */ }
14 { SETEQ 1 - { 12 13 }{ 17 } /*tmp.i */ }
15 { CHOOSER 1 - { 14 14 14 }{ 17 } /* */ }
16 { OUT 4 - { 15 9 }{ 17 } /* */ }
17 { LOOP 0 - { 5 16 }{ 17 } /* */ }
18 { PARAM 1 2 { 16 }{ } /* 1 */ }
19 { VLOAD 1 - { 3 18 }{ } /*tmp4.i */ }
20 { IN 6 - { 19 2 }{ } /* */ }
21 { PARAM 4 2 { 20 }{ 32 } /* 1 */ }
22 { PARAM 1 0 { 20 }{ 32 } /* 0 */ }
23 { PI 0 - { 22 24 }{ 32 } /* */ }
24 { VLOAD 1 - { 21 23 }{ 32 } /*tmp.i11 */ }
25 { UEXTEND 4 - { 24 }{ 32 } /*tmp6.i12 */ }
26 { CONST 4 1 { 20 }{ 32 } /* */ }
27 { AND 4 - { 25 26 }{ 32 } /*tmp2.i13 */ }
28 { CONST 4 0 { 20 }{ 32 } /* */ }
29 { SETEQ 1 - { 27 28 }{ 32 } /*tmp.i14 */ }
30 { CHOOSER 1 - { 29 29 29 }{ 32 } /* */ }
31 { OUT 4 - { 30 24 }{ 32 } /* */ }
32 { LOOP 0 - { 20 31 }{ 32 } /* */ }
33 { PARAM 1 2 { 31 }{ } /* 1 */ }
34 { VLOAD 1 - { 3 33 }{ } /* tmp4.i16 */ }
35 { IN 6 - { 34 2 }{ } /* */ }
36 { PARAM 4 2 { 35 }{ 47 } /* 1 */ }
37 { PARAM 1 0 { 35 }{ 47 } /*0 */ }
38 { PI 0 - { 37 39 }{ 47 } /* */ }
39 { VLOAD 1 - { 36 38 }{ 47 } /* tmp.i2 */ }
40 { UEXTEND 4 - { 39 }{ 47 } /* tmp6.i3 */ }
41 { CONST 4 1 { 35 }{ 47 } /* */ }
42 { AND 4 - { 40 41 }{ 47 } /*tmp2.i4 */ }
43 { CONST 4 0{ 35 }{ 47 } /* */ }
44 { SETEQ 1 - { 42 43 }{ 47 } /* tmp.i5 */ }
45 { CHOOSER 1 - { 44 44 44 }{ 47 } /* */ }
46 { OUT 4 - { 45 39 }{ 47 } /* */ }
47 { LOOP 0 - { 35 46 }{ 47 } /* */ }
48 { PARAM 1 2 { 46 }{ } /* 1 */ }
49 { VLOAD 1 - { 3 48 }{ } /* tmp4.i7 */ }
50 { CONST 1 97 { }{ } /* */ }
51 { SETEQ 1 - { 19 50 }{ } /* tmp */ }
52 { COND 0 - { 51 }{ } /* */ }
53 { CONST 1 117 { }{ 52 } /* */ }
54 { CVSTORE 1 - { 53 4 51 49 }{ 52 } /* */ }
55 { CONST 1 98 { }{ 52 } /* */ }
56 { SETEQ 1 - { 34 55 }{ 52 } /* tmp9 */ }
57 { AND 1 - { 56 51 }{ 52 } /* */ }
58 { COND 0 - { 56 }{ 52 } /* */ }
59 { CONST 1 118 { }{ 58 52 } /* */ }
60 { CVSTORE 1 - { 59 4 57 54 }{ 58 52 } /* */ }
61 { CONST 1 99 { }{ 58 52 } /* */ }
62 { SETEQ 1 - { 49 61 }{ 58 52 } /* tmp14 */ }
63 { AND 1 - { 62 57 }{ 58 52 } /* */ }
64 { COND 0 - { 62 }{ 58 52 } /* */ }
65 { CONST 1 119 { }{ 64 58 52 } /* */ }
66 { CVSTORE 1 - { 65 4 63 60 }{ 64 58 52 } /* */ }
67 { CHOOSER 0 - { 62 66 60 }{ 58 52 } /* */ }
68 { CHOOSER 0 - { 56 67 54 }{ 52 } /* */ }
69 { CHOOSER 0 - { 51 68 49 }{ } /* */ }
70 { CONST 1 10{ }{ } /* */ }
71 { VSTORE 1 - { 70 4 69 }{ } /* */ }
72 { CONST 40 { }{ } /* */ }
73 { RETURN 4 - { 72 71 }{ } /* */ }
}
```

It is understood that the conditional store command on line 54 of the exemplary unordered software object list bears the same conditional logic as the condition on line 52 (51), whereas the conditional store command on line 60 of the exemplary unordered software object list bears the conditional logic of both the condition on line 52 (51) and the condition on line 58 (56); this is a condition chain. Continuing the condition chain of the exemplary unordered software object list, the conditional store on line 66 depends on all three conditions 51, 56, and 62 being true.

Alternatively, if a branch object of the ordered list L is found in step 7.02, the processor 2A determines in step 7.08 whether the branch object contains a forward branch instruction, e.g., a forward branch opcode. When the processor 2A determines in step 7.08 that the branch object contains a forward branch instruction, the processor 2A proceeds on to step 7.10 and to convert the forward branch object into a condition construct C.01-C.N and to form and populate additional constructs C.01-C.M as discussed in FIG. 8 and accompanying text. Optional details of the procedure of step 7.08 of forming a condition construct are disclosed in FIG. 8.

The processor 2A proceeds from step 7.10 back to step 7.02 and to seek an additional branch instruction in a further descending address within the sequence SEQ.

When the processor 2A determines in step 7.08 that the branch object of the ordered list L does not contain a forward branch opcode, the processor 2A proceeds on to step 7.12 and to convert the forward branch object into a loop construct C.01-C.N and to form and populate additional constructs C.01-C.N as discussed in FIG. 9 and accompanying text. Optional details of the procedure of step 7.12 of forming a condition construct are disclosed in FIG. 9.

The processor 2A proceeds from step 7.12 back to step 7.02 and to seek an additional branch instruction in a descending position within the sequence SEQ. Alternatively, when the processor 2A determines in step 7.10 that the instant branch object does not contain a back branch instruction, the processor 2A proceeds back to step 7.02.

FIG. 7 is a flowchart of an embodiment of the invented method wherein an ordered list of software objects L that each optionally include an opcode 4000-4999 into a non-linearly ordered plurality of software objects C.01-C.N that are associated to replicate the process and logic of the ordered list of software objects L.

Referring now to FIG. 8, FIG. 8 is a flowchart of an instance of an aspect of the process of FIG. 7 of step 7.10 wherein the logic and flow of a forward branch logic as expressed by the ordered list of software objects L is replicated by a plurality of non-linearly associated software objects C.01-C.N.

In an exemplary application of step 7.10, steps 8.02 through 8.18 are applied to the forward branch logic loop of instructions 4100-4199.

In the step 8.02 the forward branch logic statement "X1?" of the exemplary forward branch instruction 4100 is reversed to a branch logic statement "NOT X1?" In order to convert the logic of the forward branch instruction 4100 from "conditional area skipped if true" to "conditional area executed if true" to support predication structures of the plurality of constructs C.01-C.N that are built to replicate the logic and flow of the instructions 4100-4199 within the plurality of constructs C.01-C.N.

In step 8.04, a forward branch instruction 4100 is converted into an exemplary condition construct C.02 that is typed as a CONDITION OBJECT. The execution of step 8.04 could optionally or alternatively be anything from (a.) the extremity of replacing the forward branch instruction 4100 with a software object of the condition construct C.02 while retaining pertinent data from the previous object; to (b.) a milder process of changing a property of a more generic opcode object. For the more extreme conversion cases, any new condition object might supply an opcode object interface in order to still be nestable.

In step 8.06 an ordered list of instructions objects 4101-4199 owned by the first forward instruction object 4100 of all opcodes and instruction objects 4100-4199 located inside the conditional area of instruction objects 4101-4199 is created. This ordered list of instruction objects 4101-4199 enables the processor 2A to determine what instructions, e.g., opcode objects, are affected by the condition construct C.02.

In optional step 8.08 a reference is added with each opcode instruction 4101-4199 of the conditional area of the forward branch object 4100, whereby each opcode condition object 4101-4199 is double linked to the forward branch construct object C.02.

In step 8.10, for each variable modified inside the conditional area of the exemplary condition construct C.02, a chooser object C.C1-C.CN having a CHOOSER type denotation. Each chooser object C.C1-C.CN that is devoted to a variable related to the instant forward logic branch loop 4100-4199 is created and inserted outside the conditional area construct object C.02.

A condition chain object C.CC1 is created in step 8.12 and may be associated with the condition construct C.02. Each logic loop nested directly inside the condition construct C.02 is converted into a conditional loop object C.L1-C.LN and the created conditional loop object C.L1-C.LN is then connected to the condition chain object C.CC1 as a condition operand of each conditional loop object C.L1-C.LN in step 8.14 referenced by the condition construct C.02.

Each memory operation nested directly inside the condition construct C.02 is converted in step 8.16 into an analogous conditional memory operation object C.M1-C.MN and the condition chain object C.CC1 is connected as the condition operand of each conditional memory operation object C.M1-C.MN referenced by the condition construct C.02.

In step 8.18 each function call nested directly inside the condition construct C.02 is converted into a hierarchical conditional call object C.HC1-C.HCN and the condition chain object C.CC1 is connected as the condition operand of each hierarchical conditional call C.HC1-C.HCN referenced by the condition construct C.02. The processor 2A proceeds from step 8.18 to step 7.02.

It is understood that the wording "directly inside" means that there are no intervening conditions between dependency of the condition chain object C.CC1 and the objects C.M1-C.MN, C.L1-C.LN & C.HC.1-C.HC.N referenced to the condition chain object C.CC1

It is understood that in certain preferred embodiments of the invented method, steps 8.14, 8.16 and 8.18 can be applied to each forward branch instruction of the sequence SEQ in question in any order in the generation of the plurality of constructs C.01-C.N.

FIG. 9 is a flowchart of an instance of an aspect of the process of FIG. 7 wherein the logic and flow of a back branch of instructions 4300-4399 as expressed by the ordered list of software objects L is replicated by the compiler SW.3 in step 7.12 by the formation and population of a plurality of non-linearly associated software objects C.01-C.N.

In step 9.02 the exemplary back branch instruction object 4399 is converted into a loop construct object C.03 by denoting the exemplary back branch instruction object 4399 as being of type LOOP. An associated loop input construct object C.LI.2 is associated at the back branch target object 4300 in step 9.04, and an associated loop output construct object C.LO.2 is associated directly in front of the back branch instruction object 4399. This associated loop output construct object C.LO.2 would be inserted in the ordered list L owned by the function object software construct C.F1. As with the loop construct object C.03, the loop output construct object C.LO.2 must be an opcode object or at least have an opcode object interface. The loop output construct object C.LO.2 is required if the operation of the resulting code of the plurality of constructs C.01-C.N is to be correctly simulated in a data flow simulator in order for data flow in the function at large to be synchronized with specific appropriate iterations of the loop logic of instructions 4300-4399.

In step 9.08 a loop ordered list construct object C.OL.2 containing the logic of the ordered list of instructions 4300-4399 owned by the loop construct C.L3 of all opcode objects inside the instant loop of instructions 4300-4399 is created. This loop ordered list construct object C.OL.2 would be inserted in the ordered list of instruction objects 4300-4399 owned by a function object software construct C.F1. The loop ordered list construct object C.OL.2 enables the processor 2A to determine which loops affect associated loop construct object C.03.

In optional step 9.10, a reference is added with each opcode instruction object 4300-4398 of the loop area of the back branch object 4399, whereby each opcode condition object 4303-4199 is double linked to the back branch construct object C.03.

In step 9.12, each initial input is threaded to the loop object construct C.03 through the loop input object C.LI.1. Here "thread" means add the datum as an operand to the loop input object C.LI.1 and also as an output from the loop object construct C.03 and then connect the construct objects C.01-C.N that use this datum to the newly created output of the loop construct object 4300-4399 rather than the original source values.

In step 9.14, each final output from the loop construct object C.03 is threaded through the loop output construct object C.LO.1. Here "thread" means add the datum as an operand to the loop output construct object C.LO.1 and also as an output from the loop construct object C.03 and then connect the operations of each construct object C.01-C.N that use this datum to the newly created output rather than the original source values.

In step 9.16, for each variable modified and accessed inside the loop of instructions 4300-4399, a variable construct object C.V1-C.VN is constructed and is referenced to the loop construct object C.03. In step 9.18 a default value is supplied is supplied into each variable construct object C.V1-C.VN that lacks an initial value.

If the code in the initial sequence SEQ already contains some variable objects converted from the original opcode list 4000-4999, the processor 2A may convert the appropriate of these to variable objects in standard form, i.e., initializer first. The term "accessed" term also includes any variable modified inside a loop conditional area 4300-4398 even if an exemplary variable isn't actually used for anything inside the conditional loop 4300-4398 because a variable value, if modified, may in fact be needed by a subsequent iteration of the loop 4300-4399 that further modifies the value inside the loop 4300-4399. For example, the following exemplary C function is offered as illustrative but not limiting example:

```
int foo( int i, int n, int a, int x )
{
    for(i = 0; i > n; i++)
    {
        if(a == 12)
            x = x + 1;
    }
    printf( "x = %d\n", x);
    return 0;
}
```

In a prior art compilers, the variable x is not a loop variable because it isn't accessed inside the loop 4300-4399 and only a final value of the variable x is applied. However, when one transforms this function into a circuit in accordance with certain optional aspects of the invented method, a relevant final value becomes a loop variable because in the stricter world of data flow, the loop circuit accesses itself to modify itself. Because the instant included loop logic expressions are inside a conditional area and inside a loop, to achieve the correct final result, a loop circuit, i.e., an electronic circuit that operates in accordance with a loop logic construct C.L1-C.Ln, requires predication in the form of being maintained as a loop variable.

Figure 10:
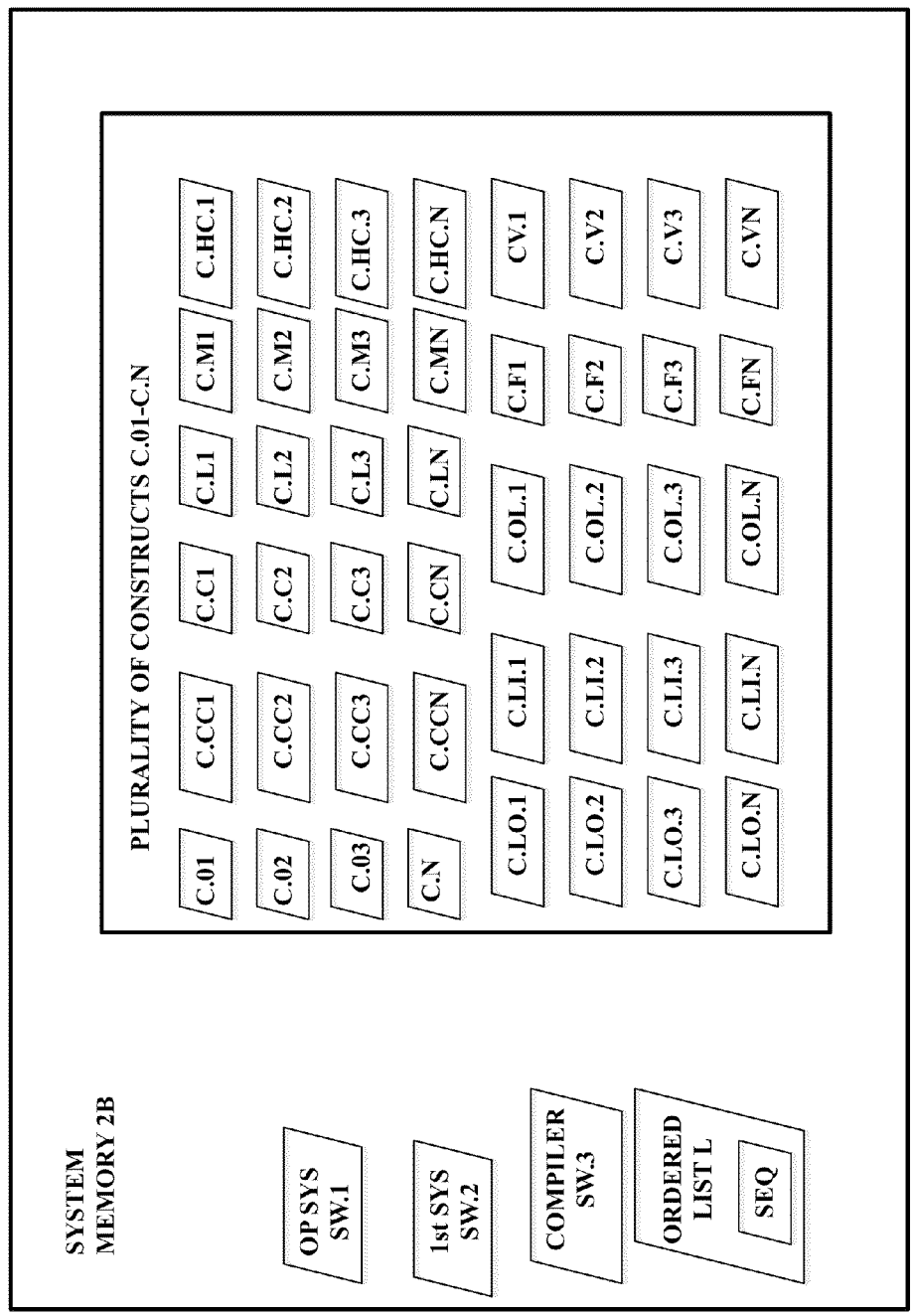
FIG. 10 is a detail illustration of the system memory of FIG. 1 and illustrating the plurality of constructs of FIG. 1 as comprising additional software constructs of the method of FIG. 8 and FIG. 9.

Referring now to FIG. 10, FIG. 10 is a detail illustration of the system memory 2B of FIG. 1 and illustrating the plurality of constructs C.01-C.N as comprising additional software constructs C.CC1-C.CCN, C.C1-C.CN, C.L1-C.LN, C.M1-C.MN, C.HC.1-C.HC.N, C.LO.1-C.LO.N, C.LI.1-CLI.N, C.OL.1-C.OL.N, C.F1-C.FN & C.V1-C.VN. It is understood that one or more, or all software constructs C.CC1-C.CCN, C.C1-C.CN, C.L1-C.LN, C.M1-C.MN, C.HC.1-C.HC.N, C.LO.1-C.LO.N, C.LI.1-C.LI.N, C.OL.1-C.OL.N, C.F1-C.FN & C.V1-C.VN and each instruction 4000-4999 may be, comprise, be comprised within, or express a software object. It is further understood that one or more, or all software constructs C.CC1-C.CCN, C.C1-C.CN, C.L1-C.LN, C.M1-C.MN, C.HC.1-C.HC.N, C.LO.1-C.LO.N, C.LI.1-C.LI.N, C.OL.1-C.OL.N, C.F1-C.FN & C.V1-C.VN and each instruction 4000-4999 may be, comprise, or express an opcode and/or an opcode information.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible configurations or aspects of the Present Invention. The examples given should only be interpreted as illustrations of some of the preferred configurations or aspects of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

I claim:

1. A method for forming logic circuits from a software encoded logic, the method comprising:
    a. Selecting an ordered list of instructions having no overlapping branch logic;
    b. Converting the ordered list of instructions into an unordered plurality of software-encoded logic constructs ("constructs"), wherein the plurality of constructs encodes all necessary opcode information and dependency information of the ordered list of instructions; and
    c. Applying the plurality of constructs to the design of a digital logic circuit, whereby an internal connectivity and a structure of the digital logic circuit are formed to embody at least some of the opcode information and dependency information of the software encoded logic.

2. The method of claim 1, wherein the dependency information embodied by the digital logic circuit includes at least one data dependency.

3. The method of claim 1, wherein the dependency information embodied by the digital logic circuit includes at least one logic dependency.

4. The method of claim 1, wherein the dependency information embodied by the digital logic circuit includes at least one memory system dependency.

5. The method of claim 1, wherein the opcode information embodied by the digital logic circuit includes at least one branch instruction.

6. The method of claim 1, wherein the opcode information embodied by the digital logic circuit includes at least one logical loop process.

7. The method of claim 1, wherein the opcode information embodied by the digital logic circuit includes at least one logical conditional process.

8. The method of claim 1, wherein the opcode information embodied by the digital logic circuit includes at least one component hierarchy.

9. The method of claim 1, wherein at least one opcode instruction of the opcode information is expressed within a software object.

10. The method of claim 1, wherein at least one opcode instruction of the opcode information is expressed within a construct.

11. A method for programming a computer comprising a parallel execution logic circuitry, the method comprising:
    a. Selecting an ordered list of instructions having no overlapping branch logic;
    b. Converting the ordered list of instructions into an unordered plurality of software-encoded logic constructs ("constructs"), wherein the plurality of constructs encodes all necessary opcode information and dependency information of the ordered list of instructions; and
    c. Converting the unordered plurality of constructs into a machine-executable software program ("machine-code"); and
    d. Operating the computer in accordance with the machine-code.

12. The method of claim 11, wherein dependency information provided in the machine-code includes at least one data dependency.

13. The method of claim 11, wherein dependency information provided in the machine code includes at least one logic dependency.

14. The method of claim 11, wherein dependency information provided in the machine code includes at least one memory system dependency.

15. The method of claim 11, wherein opcode information provided in the machine code includes at least one branch instruction.

16. The method of claim 11, wherein opcode information provided in the machine code includes at least one logical loop process.

17. The method of claim 11, wherein opcode provided in the machine-code includes at least one logical conditional process.

18. The method of claim 11, wherein opcode information provided in the machine code includes at least one component hierarchy.

19. The method of claim 11, wherein at least one opcode instruction of the opcode information is expressed within a software object.

20. The method of claim 11, wherein at least one opcode instruction of the opcode information is expressed within a construct.

* * * * *